(12) United States Patent
Wozniak et al.

(10) Patent No.: US 12,664,409 B2
(45) Date of Patent: Jun. 23, 2026

(54) NEUROMORPHIC SPIKE INTEGRATOR APPARATUS

(71) Applicant: International Business Machines Corporation, Armonk, NY (US)

(72) Inventors: Stanislaw Andrzej Wozniak, Kilchberg (CH); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1290 days.

(21) Appl. No.: 16/565,852

(22) Filed: Sep. 10, 2019

(65) Prior Publication Data

US 2021/0073620 A1 Mar. 11, 2021

(51) Int. Cl.
*G06N 3/063* (2023.01)
*G06N 3/02* (2006.01)
*G06N 3/049* (2023.01)

(52) U.S. Cl.
CPC .............. *G06N 3/063* (2013.01); *G06N 3/02* (2013.01); *G06N 3/049* (2013.01)

(58) Field of Classification Search
CPC ......... G06N 3/088; G06N 3/02; G06N 20/00; G06N 3/126; G06N 3/086; G06N 3/08; G06N 20/20; G06N 3/045; G06N 3/047; G06N 3/084; G06N 7/01; G06N 3/044; G06N 3/006; G06N 5/046; G06N 3/042; G06N 3/049; G06N 5/01; G06N 20/10; G06N 3/043; G06N 3/008; G06N 3/063; G06N 3/065; G06N 3/04; G06N 3/048;

G06N 5/04; G06N 3/004; G06N 5/022; G06N 3/0464; G06N 3/0675; G06N 3/082; G06N 3/10; G06N 5/02; G06N 5/025; G06N 7/02; G06N 3/0418; G06N 3/0495; G06N 3/061; G06N 3/09; G06N 5/043

See application file for complete search history.

(56) References Cited

U.S. PATENT DOCUMENTS

| | | |
|---|---|---|
| 2018/0075345 A1 | 3/2018 | Gottfried et al. |
| 2018/0082173 A1 | 3/2018 | Alvarez-Icaza Rivera et al. |
| 2018/0174053 A1 | 6/2018 | Lin |

OTHER PUBLICATIONS

Yoon, Young C., Lif and Simplified SRM Neurons Encode Signals Into Spikes via a Form of Asynchronous Pulse Sigma-Delta Modulation, May 2017, IEEE Transactions on Neural Networks and Learning Systems, vol. 28, No. 5, May 2017 (Year: 2017).*
Moisy et al., Computing with Spiking Neuron Networks, 2012 (Year: 2012).*
Gallo et al., Mixed-Precision In-Memory Computing, 2018 (Year: 2018).*

(Continued)

*Primary Examiner* — David Yi
(74) *Attorney, Agent, or Firm* — Caleb D. Wilkes

(57) ABSTRACT

The present disclosure relates to an apparatus that includes a neuromorphic spike integrator apparatus for neural networks. The apparatus receives at least one input signal encoding information in arrival time of the input signal at the apparatus. The received signal is weighted with a weight value corresponding to the arrival time. The weighted received signal is integrated into a current value of a state of the apparatus and a signal is output based on the current value of the state.

20 Claims, 3 Drawing Sheets

(56) References Cited

OTHER PUBLICATIONS

Yin et al., Algorithm and Hardware Design of Discrete-Time Spiking Neural Networks Based on Back Propagation with Binary Activations, 2017 (Year: 2017).*

Kim et al., Deep Neural Networks with Weighted Spikes, 2018 (Year: 2018).*

Diehl et al., "Conversion of Artificial Recurrent Neural Networks to Spiking Neural Networks for Low-power Neuromorphic Hardware", 2016 IEEE International Conference on Rebooting Computing (ICRC), © IEEE 2016, pp. 1-8.

Kim et al., "Analog CMOS-based Resistive Processing Unit for Deep Neural Network Training", 2017 IEEE 60th International Midwest Symposium on Circuits and Systems (MWSCAS), © 2017 IEEE, pp. 422-425.

Mostafa et al., "Fast Classification Using Sparsely Active Spiking Networks", 2017 IEEE International Symposium on Circuits and Systems (ISCAS), © 2017 IEEE, 4 pages.

Rueckauer et al., "Conversion of analog to spiking neural networks using sparse temporal coding", 2018 IEEE International Symposium on Circuits and Systems (ISCAS), © 2018 IEEE, 5 pages.

Sidler et al., "Unsupervised Learning Using Phase-Change Synapses and Complementary Patterns", ICANN 2017, Part I, LNCS 10613, © Springer International Publishing AG 2017, pp. 281-288.

Zhao et al., "Interspike-Interval-Based Analog Spike-Time-Dependent Encoder for Neuromorphic Processors", IEEE Transactions on Very Large Scale Integration (VLSI) Systems, vol. 25, No. 8, Aug. 2017, pp. 2193-2205.

Kuzum et al., "Synaptic electronics: materials, devices and applications," IOP Publishing, Nanotechnology 24 (2013) 382001, Published: Sep. 2, 2013, stacks.iop.org/Nano/24/382001, 22 pages.

Le Gallo et al., "Mixed-precision in-memory computing," Nature Electronics, vol. 1, Apr. 2018, https://www.nature.com/articles/s41928-018-0054-8, pp. 246-253.

Modha et al., "Cognitive Computing," Communications of the ACM, Aug. 2011, vol. 54, No. 8, DOI:10.1145/1978542.1978559, pp. 62-71.

Pantazi et al., "All-memristive neuromorphic computing with level-tuned neurons," IOP Publishing, Nanotechnology 27 (2016) 355205, Published: Jul. 26, 2016, doi: 10.1088/0957-4484/27/35/355205, 13 pages.

Wozniak et al., "Learning Spatio-Temporal Patterns in the Presence of Input Noise using Phase-Change Memristors," IEEE, 2016, Downloaded: Sep. 12, 2023, https://ieeexplore.ieee.org/stamp/stamp.jsp?tp=&arnumber=7527246, pp. 365-368.

* cited by examiner

501 —

Weight a received signal with a weight value
corresponding to the arrival time of the received signal

503 —

Integrate the weighted received signal into a current value
of a state of the apparatus

505 —

Output a signal based on the current value of the state

NEUROMORPHIC SPIKE INTEGRATOR APPARATUS

BACKGROUND

The present invention relates to the field of computer systems, and more specifically, to a neuromorphic spike integrator apparatus for neural networks.

Neural networks are a computational model used in artificial intelligence systems. Neural networks are based on multiple artificial neurons. Each artificial neuron is connected with one or more other neurons, and links can enhance or inhibit the activation state of adjoining neurons. Artificial neurons are provided with a firing threshold that must be exceeded by a membrane potential of the neurons in order to generate a spike. This thresholding is a component of spiking neural network (SNNs).

SUMMARY

Various embodiments provide a neuromorphic spike integrator apparatus for neural networks and provide a computer program product, synapse system and method for determining synaptic weights as described by the subject matter of the independent claims. Advantageous embodiments are described in the dependent claims. Embodiments of the present invention can be freely combined with each other if they are not mutually exclusive.

In one aspect, the invention relates to a neuromorphic spike integrator apparatus for neural networks being configured for: (i) receiving at least one input signal encoding information in arrival time of the input signal at the apparatus; (ii) weighting the received signal with a weight value corresponding to the arrival time; (iii) integrating the weighted received signal into a current value of a state of the apparatus; and (iv) outputting a signal based on the current value of the state.

In another aspect, the invention relates to a neuromorphic spike integrator apparatus for neural networks being configured for: (i) receiving input signals encoding information in arrival time of the input signal at the apparatus; (ii) weighting each of the received signals with a respective weight value corresponding to the arrival time of the received signals; (iii) integrates the weighted received signals into a current value of a state of the spike integrator apparatus; and (iv) outputting a spike based on the current value of the state.

In another aspect, the invention relates to a method comprising: receiving at least one input signal encoding information in arrival time of the input signal at a spike integrator neuron apparatus; weighting the received signal with a weight value corresponding to the arrival time; integrating the weighted received signal into a current value of a state of the apparatus; outputting a signal based on the current value of the state.

In another aspect, the invention relates to an artificial neural network comprising multiple layers, wherein at least one layer of the multiple layers comprises one or more neuron realizations that include the neuromorphic spike integrator apparatus according to preceding embodiments.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
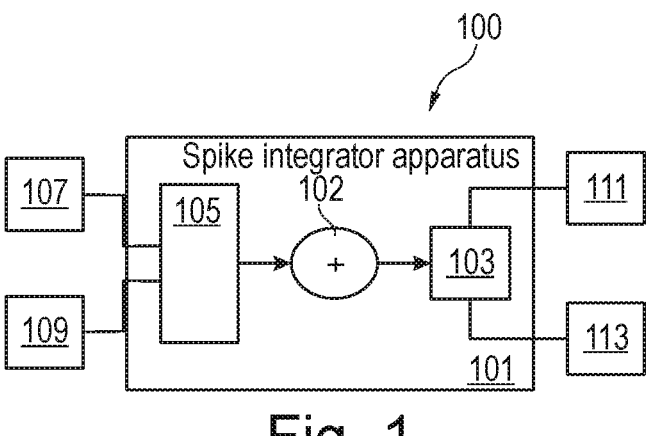
FIG. 1 illustrates an example of a neuron system in accordance with the present disclosure.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable to enhance the operation of neuromorphic spike-based apparatuses by efficiently controlling the spiking capabilities of neuromorphic spike-based apparatuses. In particular, the present subject matter makes use of input timing information, which has theoretically appealing capabilities to more efficiently transmit the information. The present subject matter exploits this timing information by making use of integration and decay features of the spike integrator apparatus. This may enable to implement a Time To Spike (TTS) aware integration based on arrival times of the signals.

In one example, the spike integrator apparatus may be implemented in at least one neuron apparatus of an artificial neural network. For example, the artificial neural network may comprise multiple layers, wherein at least one layer of the multiple layers comprises one or more neuron apparatuses that include the neuromorphic spike integrator apparatus.

In another example, the spike integrator may be implemented in a hardware accelerator. The hardware accelerator may comprise crossbar arrays that are configured to perform multiplication operations such as vector-matrix multiplications. The spike integrator apparatus may be used to determine the results of multiplication in the crossbar arrays performed with temporally coded inputs. This may reduce the energy use and maximum current load in comparison to Pulse Width Modulation (PWM) based designs.

According to one embodiment, the apparatus is further configured for determining the weight value as a value of a modulating function at the arrival time, wherein the modulating function is a time dependent piecewise linear function. This embodiment may enhance the capabilities of the neuron in distinguishing signal sequences. For example, if a same set of signals is received multiple times, wherein in each time the signals are received with a different order, this would result in different accumulated values of the state. This is by contrast to a conventional method where all of the received sets would result in the same value of the state regardless of the order of their reception.

According to one embodiment, the modulating function has values decreasing with increasing arrival time values.

According to one embodiment, the apparatus is further configured for determining the weight value as a value of a modulating function at the arrival time, wherein the modulating function is a time dependent nonlinear function involving a predefined range of values of the encoded information.

This embodiment may be advantageous as the range of values is increased, and the resolution is maintained through emission of further pulses with increasingly fine-grain contributions. The resolution may refer to a time resolution at which the apparatus can process signals, e.g., the range of values that can be processed by the apparatus may be dependent on the resolution.

According to one embodiment, the modulating function is: $R/2^{(\Delta t+1)}$, where R is the range of values of the encoded information and $\Delta t$ is indicative of the arrival time of the signal.

According to one embodiment, the apparatus is further configured for shifting the value of the modulating function at the arrival time of a given signal with a shift term, and incorporating (or using) a decay behavior of the state variable based on the shift term, with the shift term being one of: a) a constant term indicative of an expected value of a future coming signal after the given signal; and b) a time dependent term dynamically determined from spiking statistics of previously received signals. This embodiment may enable to better process nonstationary spiking probabilities by dynamically adjusting the modulating term (weight value). The modulating term may be dynamically adjusted by collecting past spiking probabilities.

This embodiment may further be advantageous as the processing latency by the spike integrator apparatus may be reduced. The latency reduction is achieved through a tradeoff of incorporating prior knowledge on spiking probabilities using an underlying assumption according to which the prior knowledge does not change, e.g. the probabilities of the spikes are stationary.

According to one embodiment, the apparatus is further configured for determining the arrival time with respect to a predefined reference point of time, wherein the reference point of time is any one of: a signal that is received at the apparatus subsequent to a refractory period; a signal that is received at the apparatus subsequent to the generation of an output signal of the apparatus; a signal that is received at the apparatus subsequent to a predefined value of the state of the apparatus; a signal that is received at the apparatus and having an amplitude higher than the current state of the apparatus; a global synchronization signal of the apparatus; and a signal that is received at the apparatus subsequent to an inhibition signal.

In one embodiment, spike integrator apparatus 101 receives, at least, one input signal encoding information in arrival time of the input signal at a neuromorphic spike integrator apparatus. Spike integrator apparatus 101 weights the received signal with a weight value corresponding to the arrival time. Spike integrator apparatus 101 integrates the weighted signal into a current value of a state of the neuromorphic spike integrator apparatus. Spike integrator apparatus 101 communicates a signal based on the current value of the state.

In one embodiment, spike integrator apparatus 101 determines the weight value as a value of a modulating function at the arrival time, wherein the modulating function is a time dependent piecewise linear function.

In one embodiment, the modulating function, of spike integrator apparatus 101, contains values decreasing with increasing arrival time values.

In one embodiment, spike integrator apparatus 101 determines the weight value as a value of a modulating function at the arrival time, wherein the modulating function is a time dependent nonlinear function involving a predefined range of values of the encoded information.

In one embodiment, the modulating function of spike integrator apparatus 101 is defined as:

$$\frac{R}{2^{\Delta t+1}},$$

where R is the range of value of the encoded information and $\Delta t$ is indicative of the arrival time of the signal.

In one embodiment, spike integrator apparatus 101 exchanges the value of the modulating function at the arrival time of a given signal with a shift term, and incorporates a decay behavior of the state variable based on the shift term, with the shift term comprising a constant term indicative of an expected value of a future coming signal after the given signal. Spike integrator apparatus 101 determines a time dependent term dynamically from spiking statistics of previously received signals.

In one embodiment, spike integrator apparatus 101 determines the arrival time with respect to a predefined reference point of time, wherein the reference point of time comprises: i) a signal that is received at the neuromorphic spike integrator subsequent to a refractory period, ii) a signal that is received at the neuromorphic spike integrator apparatus subsequent to the generation of an output signal of the neuromorphic spike integrator apparatus, iii) a signal that is received at the neuromorphic spike integrator apparatus subsequent to a predefined value of the state of the neuromorphic spike integrator apparatus, iv) a signal that is received at the neuromorphic spike integrator apparatus and having an amplitude higher than the current state of the neuromorphic spike integrator apparatus, v) a global synchronization signal of the neuromorphic spike integrator apparatus, and vi) a signal that is received at the neuromorphic spike integrator apparatus subsequent to an inhibition signal.

In one embodiment, an artificial neural network includes multiple layers, wherein at least one layer of the multiple layers comprises one or more neuron realizations that include neuromorphic spike integrator apparatus 101.

FIG. 1 illustrates an example of a neuron system (or neuron realization) 100 in accordance with an example of the present disclosure.

The neuron system 100 comprises a spike integrator apparatus 101. The spike integrator apparatus 101 receives and processes incoming signals such as incoming spikes. For example, for at least one incoming signal received, the spike integrator apparatus 101 integrates a corresponding value of the received signal into a membrane state variable (e.g. referred to herein as membrane potential variable) $V_m$ of the apparatus 100.

The spike integrator apparatus 101 comprises a selection unit 105, an adder 102, and a memory 103. The memory 103 maintains a temporary variable representing the membrane potential variable $V_m$ of the spike integrator apparatus 101.

For example, a spike $s_i$ that corresponds to the received signal may pass through a synapse unit 109 with a weight $w_i$ and the value of the received signal may be equal to $w_i \times s_i$, which is the result of multiplication of $s_i$ by $w_i$. The synapse unit 109 is further configured to provide the spike integrator apparatus 101 with the value $x_i = w_i \times s_i$. In a spiking neural network, $s_i$ may have values 0 or 1. The selection unit 105 selects for each received signal $x_i$ a weight value (or modulating term) $\alpha_i$ that corresponds to the arrival time of the received signal $x_i$ and performs a multiplication of the selected weight value and a value of the received signal. The selection unit 105 outputs the result of the multiplication.

The adder 102 is configured to receive said result of multiplication from the selection unit 105 and to add or integrate that received result of multiplication into the membrane potential variable $V_m$ of the spike integrator apparatus 101.

The neuron system 100 further comprises a comparator 113. The comparator 113 is configured to determine whether the membrane potential variable $V_m$ of the spike integrator apparatus 101 is greater than or equal to a threshold value. The threshold value may for example be received from a unit (not shown) of the neuron system 100 or may be stored in the comparator 113. The spike integrator apparatus 101 is configured to spike when the membrane potential variable $V_m$ is greater than or equal to the threshold value.

The neuron system 100 further comprises a reset unit 111. When the spike integrator apparatus 101 spikes, the reset unit 111 is configured to set the membrane potential variable $V_m$ to a reset value e.g. to a stored reset value.

Figure 3:
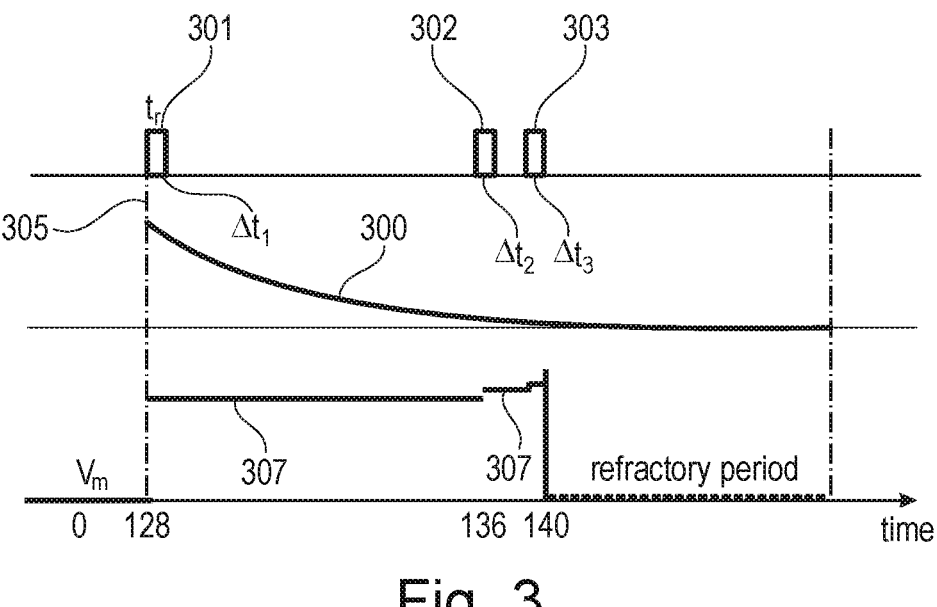
FIG. 3 illustrates an example time dependent function for determining weight values in accordance with the present disclosure.
Figure 4:
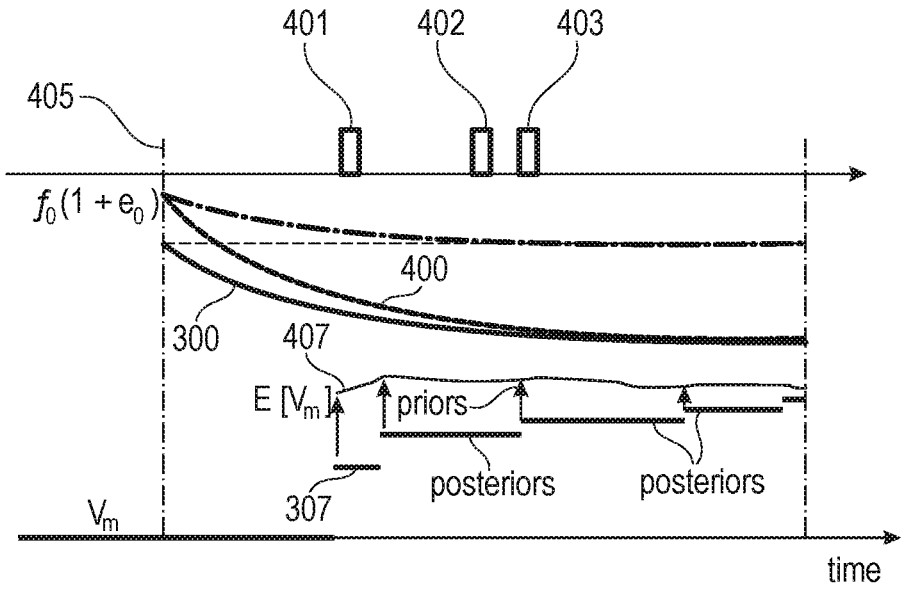
FIG. 4 illustrates an example time dependent function for determining weight values in accordance with the present disclosure.

The neuron system 100 further comprises a weight unit 107 configured to provide weight values $\alpha_i$ to the selection unit 105. The weight unit 107 may for example comprise a lookup table comprising the weight values $\alpha_i$ in association with time values. In another example, the weight values may be generated in accordance with the predefined time dependent function by a generator circuit, of the weight unit, providing continuous signal. The weight values $\alpha_i$ may be obtained from a predefined time dependent function. For example, for an arrival time of a received signal, the function may provide its corresponding weight value $\alpha_i$. FIGS. 2-4 describe examples of this time dependent function.

Figure 2A:
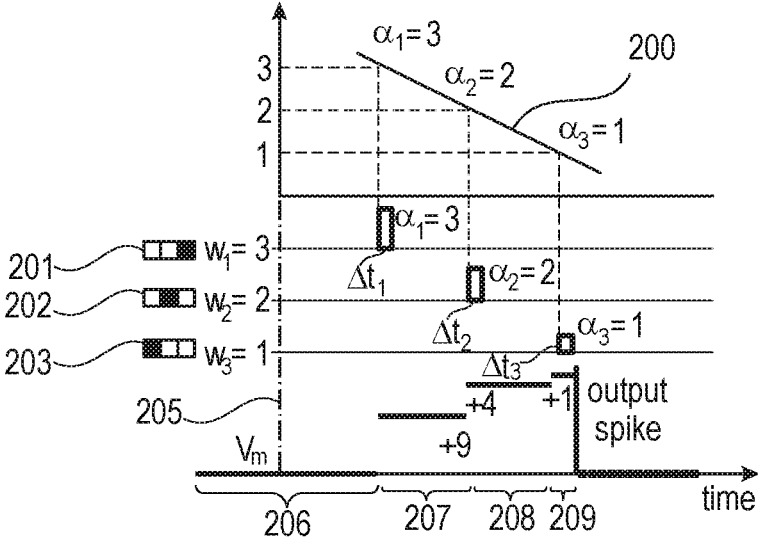
FIG. 2A illustrates an example time dependent function for determining weight values in accordance with the present disclosure.

FIG. 2A illustrates an example linear time dependent function 200 that may be used to determine the weight values $\alpha_i$ in accordance with the present subject matter. In the example of FIG. 2A a sequence of three signals 201-203 is received at the spike integrator apparatus 101. Each square is associated with a respective signal 201-203 to indicate its order in the sequence, wherein a black square indicates that the respective signal of the sequence is received (e.g. it denotes a spike or "1") and a white square denotes lack of input or "0". Each of the received signals 201-203 may, for example, be multiplied by a weight $w_1$-$w_3$ of the respective synapse, wherein $w_1 = 3$, $w_2 = 2$ and $w_3 = 1$. The values of the signals 201-203 may thus be the respective values $w_1$-$w_3$ e.g. in case the spikes have 0 or 1 values only.

The three signals 201-203 may be received consecutively at the spike integrator apparatus 101. The arrival time $\Delta t_1$, $\Delta t_2$ and $\Delta t_3$ of the signals 201-203 respectively may be determined with respect to the reference point of time 205.

In the example of FIG. 2A, the signal 201 is first received followed by the signal 202 and followed by the signal 203.

Before the arrival of the signals 201-203, the membrane potential $V_m$ of the spike integrator apparatus 101 may be in a certain (first) level (e.g. 0) during the time period 206. After the arrival of the signal 201, the spike integrator apparatus 101 may assign a weight to the value $w_1$ using the weight value $\alpha_1$ and integrate the resulting value $\alpha_1 w_1$ into the membrane potential $V_m$. This would result in a new second level of the membrane potential $V_m$ in the time period 207 before the second signal is received. As indicted in FIG. 2A, $\alpha_1 = 3$, and thus the new level of $V_m$ may be obtained by adding 9 to the first level of $V_m$.

After the arrival of the signal 202, the spike integrator apparatus 101 may assign a weight to the value $w_2$ using the weight value $\alpha_2$ and integrate the resulting value $\alpha_2 w_2$ into the membrane potential $V_m$. This would result in a new third level of the membrane potential $V_m$ in the time period 208 before the third signal is received. As indicted in FIG. 2A, $\alpha_2 = 2$, and thus the new level of $V_m$ may be obtained by adding 4 to the second level of $V_m$.

After the arrival of the signal 203, the spike integrator apparatus 101 may assign a weight to the value $w_3$ using the weight value $\alpha_3$ and integrate the resulting value $\alpha_3 w_3$ into the membrane potential $V_m$. This would result in a new fourth level of the membrane potential $V_m$ in the time period 209. As indicted in FIG. 2A, $\alpha_3 = 1$, and thus the new level of $V_m$ may be obtained by adding 1 to the third level of $V_m$.

The weight values $\alpha_1$, $\alpha_2$ and $\alpha_3$ may be values of the function 200 at time points $\Delta t_1$, $\Delta t_2$ and $\Delta t_3$ respectively. In this case, $V_m = 14$ which may be the maximum possible value and corresponds to the pixel or sequence, signal 201, followed by signal 202 and followed by signal 203.

The membrane potential variable $V_m$ of the spike integrator apparatus 101 may regularly (e.g. after each integration) be compared with a threshold value and if it exceeds that threshold value, the spike integrator apparatus 101 may spike. This is indicated in FIG. 2A, where the fourth level of $V_m$ may exceed the threshold value.

Figure 2B:
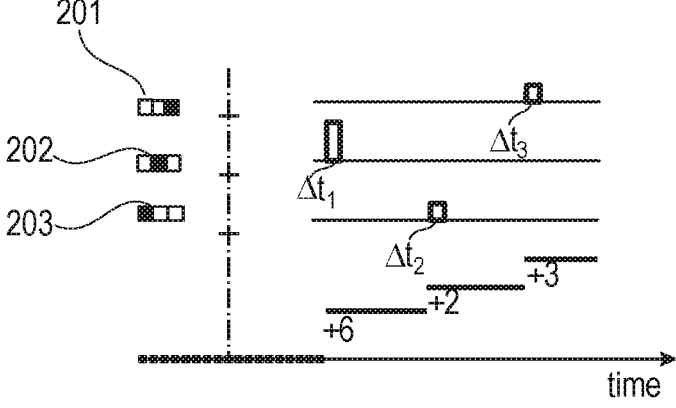
FIG. 2B illustrates an example time dependent function for determining weight values in accordance with the present disclosure.

FIG. 2B is similar to FIG. 2A, with the exception that the signals 201-203 are illustrated as being received in a different order. In the example, of FIG. 2B, the arrival time of the signal 202 is $\Delta t_1$, the signal 203 is received at $\Delta t_2$ and the signal 201 is received at $\Delta t_3$. The difference in the reception order would result in the membrane potential $V_m$ being increased by different amount values. The membrane potential may be changed as described with reference to FIG. 2A by choosing the right weights $\alpha_i$ for each received signal using the arrival time of the signal.

In the example of FIG. 2B, the second level of $V_m$ is at $V_m + 6$ instead of $V_m + 9$ as in FIG. 2A. The third level of $V_m$ is at $V_m + 2$ instead of $Vm + 4$ as in FIG. 2A. The fourth level of $V_m$ is at $V_m + 3$ instead of $V_m + 1$ as in FIG. 2A.

FIGS. 2A and 2B illustrate that the spike integrator apparatus can capture the temporal order of the input signals by contrast to conventional methods. For example, with a conventional method the signals of FIGS. 2A and 2B would result in the same membrane potential.

FIG. 3 illustrates an example non-linear time dependent function $f(\Delta t)$ 300 that may be used to determine the weight values $\alpha_i$ in accordance with the present subject matter. The function 300 may involve a predefined range of values of the encoded information. For example, the function may be equal to $$f(\Delta t) = \frac{R}{2^{\Delta t + 1}}$$

where R is the range of values of the encoded information and $\Delta t$ is indicative of the arrival time of a signal. In comparison to the linear function case, with the non-linear function the range of values may be increased. For example, R may be equal to 256. The resolution is maintained through emission of further pulses with increasingly fine-grain contributions.

In the example of FIG. 3 three signals 301-303 are received at the spike integrator apparatus 101 at arrival times $\Delta t_1$, $\Delta t_2$ and $\Delta t_3$ respectively. The arrival times may be determined with respect to the reference point of time 305. The membrane potential $V_m$ may be changed as described with reference to FIG. 2A, wherein the weight values $\alpha_i$ are obtained using the function 300.

Using the function 300 of FIG. 3, the membrane potential $V_m$, as indicated by the lines, 307, monotonically approaches the transmitted value. However, to obtain the exact value, there may be a need to wait till "the end of transmission". This may introduce a latency in temporal code-based systems. To overcome this, the function 300 may be improved by shifting its values as described in FIG. 4.

FIG. 4 illustrates an example non-linear time dependent function 400 that may be used to determine the weight values $\alpha_i$ in accordance with the present subject matter. The function 400 may be obtained from the function $f(\Delta t)$ of FIG. 3. For example for each received signal, the value of the function $f(\Delta t)$ at the arrival time of said signal may be shifted or scaled by a shift term indicative of an expected value of a future coming signal after said signal.

In the example of FIG. 4 three signals 401-403 are received at the spike integrator apparatus 101 at arrival times $\Delta t_1$, $\Delta t_2$ and $\Delta t_3$ respectively. The arrival times may be determined with respect to the reference point of time 405. The membrane potential $V_m$ may be changed (to obtain values indicated by line 407) as described with reference to FIG. 2A, wherein the weight values $\alpha_i$ are obtained using the function 400.

In a first example, the shift term may be a constant term $e_0$. For that, the function 400 of FIG. 4 may be defined as follows $f(\Delta t)(1+e_0)$ using the constant term $e_0$. This may enable to adjust the function $f(\Delta t)$ to the priors. The apparatus may enable that the contributions of priors may be eliminated from $V_m$ when posteriors become available through a decrease of $V_m$ (e.g. decay of a Leaky Integrate & Fire neuron (LIF)). FIG. 4 shows the difference between the values of $V_m$ 407 when using the function 400 and the values of $V_m$ 307 obtained by the function 300. $e_0$ may be defined as follows; assuming stationary probabilities so that:

$$P(x(t_{i+1}) = 1 | \forall_{i \leq t} \, x(t_i) = 0) = 0, \ P(x(t_{i+1}) = 1 | x(t_i) = 1) = \frac{1}{2},$$

wherein $e_0$ can be defined as $$e_0 = \mathbb{E}\left[\sum_{t=1,\ldots} P(x(t_{i+1}) = 1 \mid x(t_i) = 1) f(\Delta t)/R\right] =$$

$$\frac{1}{2}\sum_{i=1,\ldots,\infty} \frac{1}{2^{i+1}}/1 = \frac{1}{2}\frac{1}{2} = 0.25.$$

The first example of FIG. 4 may particularly be advantageous as it may reduce the latency of the spike integrator apparatus. The latency reduction is achieved through a tradeoff of incorporating prior knowledge on spiking probabilities into the system using an underlying assumption according to which the prior knowledge does not change, e.g. the probabilities of the spikes are stationary. This may enable to calculate constant adjustments for the modulating term. The advantage of this assumption is that it enables a very simple implementation. For example, no additional implementation complexity may be needed for the adjustment of the modulating term by a constant, and convergence towards posteriors may make use of decay, which is already in the neuron models.

However, if the probabilities change over time, the values received by incorrect predictions of the system may cause deviations between the priors and the true posteriors. The system may fail to operate correctly, and the advantage of reduced latency might become irrelevant. To better process nonstationary spiking probabilities, the modulating term may be dynamically adjusted by collecting past spiking probabilities into meta parameters $\theta$. This may be achieved by a second example of FIG. 4 in which the shift term is a time dependent term. For that, the function 400 of FIG. 4 may be defined as follows $f(\Delta t)(1+e_\theta(t))$ using a time dependent term $e_\theta(t)$.

In the first and second examples, the spike integrator apparatus has an intrinsic decay behavior which is interconnected with the priors in a way that it compensates for their impact as time goes by. For example, the decay behavior of the state variable of the spike integrator apparatus may be defined based on the shift term as $$\tau = \sqrt[N-1]{1+e_0}.$$

That is, for a code with 8 steps $1/\tau \approx 0967$. The decay is defined so that while the actual inputs are being observed, the decay "removes" the contributions of the priors as illustrated in FIG. 4 by the arrows, representing the contributions of the priors, becoming smaller.

Figure 5:
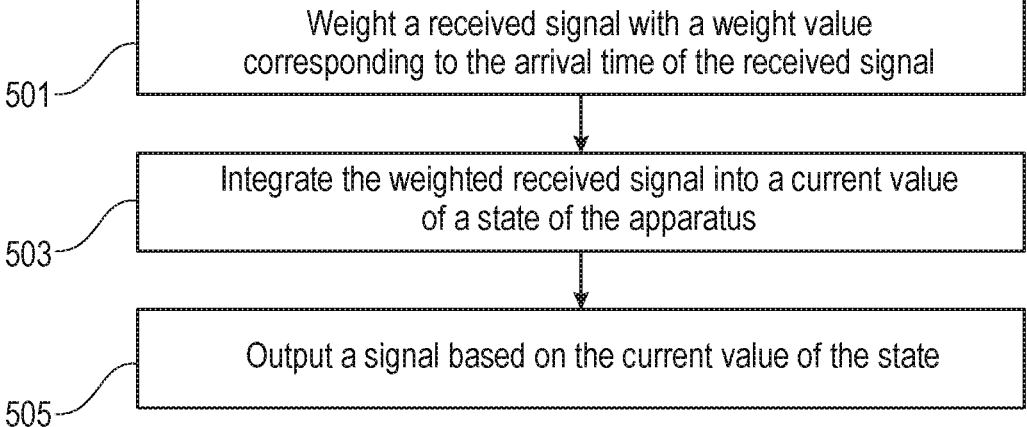
FIG. 5 is a flowchart of a method for spiking signals by a spike integrator apparatus in accordance with an example of the present disclosure.

FIG. 5 is a flowchart of a method in accordance with the present subject matter. The method comprises steps 501-505 for each received signal at a spike integrator apparatus e.g. 101. For example, the signals processed with the method of FIG. 5 may be received during a predefined time period.

In step 501, the received signal may be weighted with a weight value corresponding to the arrival time of the received signal. For example, the arrival time of the received signal may be determined with respect to a reference point of time.

In step 503, the weighted received signal may be integrated into a current value of a state $V_m$ of the apparatus.

In step 505, a signal e.g. a spike, may be output by the apparatus based on the current value of the state. For example, step 505 comprises comparing the current value of the state $V_m$ with a predefined threshold value. If the current value of the state exceeds the threshold value, the apparatus may output the signal.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer system comprising:
one or more computer processors;
one or more computer readable storage medium; and program instructions stored on the computer readable storage medium for execution by at least one of the one or more processors to cause the computer system to:

receive multiple input signals at a respective arrival time at a neuromorphic spike integrator apparatus;

weight the received signals with a respective weight value corresponding to the respective arrival time, wherein the respective weight value is determined as a respective output of a modulating function using the respective arrival time as respective input to the modulating function, the modulating function being a time-dependent linear function;

integrate the weighted received signals into a current value of a state of the neuromorphic spike integrator apparatus, wherein the current value is adjusted intermittently via a first adjustment and a second adjustment before a spike output of the neuromorphic spike integrator apparatus occurs, with each of the first and second adjustments occurring in response to receiving a respective one of the weighted received signals, and wherein the first adjustment adjusts the current value to a first amount above a reset value and the second adjustment adjusts the current value to a second amount that is greater than the first amount; and communicate a spike output based on the current value of the state being greater than or equal to a threshold value.

2. The computer system of claim 1, wherein the time-dependent linear function is a time-dependent piecewise linear function.

3. The computer system of claim 1, wherein the outputs of the time-dependent linear function decrease with increasing arrival time values.

4. The computer system of claim 1, wherein the arrival time is determined with respect to a predefined reference point of time based on one of:

(i) a signal that is received at the neuromorphic spike integrator subsequent to a refractory period;

(ii) a signal that is received at the neuromorphic spike integrator apparatus subsequent to generation of an output signal of the neuromorphic spike integrator apparatus;

(iii) a signal that is received at the neuromorphic spike integrator apparatus subsequent to a predefined value of the state of the neuromorphic spike integrator apparatus;

(iv) a signal that is (a) received at the neuromorphic spike integrator apparatus and (b) has an amplitude higher than the current state of the neuromorphic spike integrator apparatus;

(v) a global synchronization signal of the neuromorphic spike integrator apparatus; or vi) a signal that is received at the neuromorphic spike integrator apparatus subsequent to an inhibition signal.

5. The computer system of claim 1, wherein the computer readable storage medium stores an artificial neural network comprising multiple layers, wherein at least one layer of the multiple layers comprises one or more neuron realizations that include a respective instance of the neuromorphic spike integrator apparatus.

6. The computer system of claim 1, wherein the neuromorphic spike integrator apparatus is implemented in a hardware accelerator that comprises crossbar arrays.

7. A computer-implemented method, the method comprising:

receiving at least one input signal at a respective arrival time at a neuromorphic spike integrator neuron apparatus, wherein the at least one input signal represents a value;

weighting, by one or more processors, the received signal with a weight value corresponding to the arrival time, the weighting comprising a multiplication of the weight value and the value, wherein the weight value is determined as an output of a modulating function using the respective arrival time as respective input to the modulating function;

integrating, by one or more processors, the weighted received signal into a current value of a state of the neuromorphic spike integrator apparatus, wherein the current value is adjusted intermittently, with each intermittent adjustment occurring in response to a respective new input signal received; and communicating, by one or more processors, a signal based on the current value of the state.

8. The computer-implemented method of claim 7, wherein the modulating function is a piecewise linear function.

9. The computer-implemented method of claim 7, wherein the modulating function is a time dependent piecewise linear function.

10. The computer-implemented method of claim 9, the method further comprising:

the modulating function having values decreasing with increasing arrival time values.

11. The computer-implemented method of claim 7, wherein the modulating function is a time dependent nonlinear function involving a predefined range of values of encoded information.

12. The computer-implemented method of claim 11, the method further comprising:

the modulating function is defined as: $R/2^{\Delta t + 1}$, where R is the range of value of the encoded information and $\Delta t$ is indicative of the time arrival of the signal.

13. The computer-implemented method of claim 11, wherein the neuromorphic spike integrator apparatus comprises a shift term for shifting the value of the modulating function at the arrival time of a given signal, and incorporating a decay behavior of a state variable based on the shift term, wherein the shift term comprises a constant term indicative of an expected value of a future coming signal after the given signal.

14. The computer-implemented method of claim 7, the method further comprising:

determining, by the one or more processors, the arrival time with respect to a predefined reference point of time, wherein the reference point of time is based on one of:

(i) a signal that is received at the neuromorphic spike integrator apparatus subsequent to a refractory period;

(ii) a signal that is received at the neuromorphic spike integrator apparatus subsequent to generation of an output signal of the neuromorphic spike integrator apparatus;

(iii) a signal that is received at the neuromorphic spike integrator apparatus subsequent to a predefined value of the state of the neuromorphic spike integrator apparatus;

(iv) a signal that is (a) received at the neuromorphic spike integrator apparatus and (b) has an amplitude higher than the current state of the neuromorphic spike integrator apparatus;

(v) a global synchronization signal of the neuromorphic spike integrator apparatus; or (vi) a signal that is received at the neuromorphic spike integrator apparatus subsequent to an inhibition signal.

15. A computer program product comprising:

one or more computer-readable storage media and program instructions stored on the one or more computer-readable storage media, the program instructions comprising:

program instructions to receive at least one input signal encoding information at a neuromorphic spike integrator apparatus, the receiving occurring at a respective arrival time;

program instructions to weight the received signal with a weight value, wherein the weight value is determined as a value of a modulating function using the arrival time as input to the modulating function, the modulating function being a time dependent nonlinear curved function involving a predefined range of values of the input signal encoding information;

program instructions to integrate the weighted received signal into a current value of a state of the neuromorphic spike integrator apparatus; and program instructions to communicate a signal based on the current value of the state.

16. The computer program product of claim 15, wherein the modulating function is defined as:

$$\frac{R}{2^{\Delta t+1}},$$

where R is the range of value of the encoded information and Δt is indicative of the arrival time of the signal.

17. The computer program product of claim 16, the program instructions further comprising:

program instructions to modify the value of the modulating function at the arrival time of a given signal based on a shift term that incorporates a decay behavior of a state variable, wherein the shift term includes a constant term indicative of an expected value of a future coming signal after the given signal.

18. The computer program product of claim 15, the program instructions further comprising:

program instructions to determine the arrival time with respect to a predefined reference point of time, wherein the reference point of time is based on one of:

(i) a signal that is received at the neuromorphic spike integrator subsequent to a refractory period;

(ii) a signal that is received at the neuromorphic spike integrator apparatus subsequent to generation of an output signal of the neuromorphic spike integrator apparatus;

(iii) a signal that is received at the neuromorphic spike integrator apparatus subsequent to a predefined value of the state of the neuromorphic spike integrator apparatus;

(iv) a signal that is (a) received at the neuromorphic spike integrator apparatus and (b) has an amplitude higher than the current state of the neuromorphic spike integrator apparatus;

(v) a global synchronization signal of the neuromorphic spike integrator apparatus; or (vi) a signal that is received at the neuromorphic spike integrator apparatus subsequent to an inhibition signal.

19. The computer program product of claim 15, the program instructions further comprising program instructions to generate an artificial neural network comprising multiple layers, wherein at least one layer of the multiple layers comprises one or more neuron realizations that include the neuromorphic spike integrator apparatus.

20. The computer program product of claim 15, the program instructions further comprising:

program instructions to modify the value of the modulating function at the arrival time of a given signal based on a shift term that incorporates a decay behavior of a state variable, wherein the shift term is a time dependent term determined dynamically from spiking statistics of previously received signals.

* * * * *